United States Patent [19]

Ruddy

[11] Patent Number: 4,629,200
[45] Date of Patent: Dec. 16, 1986

[54] NON-METALLIC PISTON RINGS WITH CONTROLLED EXPANSION PRESSURE

[75] Inventor: Brian L. Ruddy, Rugby, England

[73] Assignee: AE PLC, Warwickshire, England

[21] Appl. No.: 638,114

[22] Filed: Aug. 6, 1984

[30] Foreign Application Priority Data

Aug. 4, 1983 [GB] United Kingdom ............... 8321051

[51] Int. Cl.$^4$ .................................... F16J 9/26
[52] U.S. Cl. ............................ 277/216; 277/DIG. 6
[58] Field of Search .......................... 277/216–224, 277/96.2, DIG. 6

[56] References Cited

FOREIGN PATENT DOCUMENTS

| | | |
|---|---|---|
| 2646922 | 4/1978 | Fed. Rep. of Germany . |
| 3022457 | 1/1982 | Fed. Rep. of Germany . |
| 2053535 | 4/1971 | France . |
| 1224486 | 3/1971 | United Kingdom . |
| 1489328 | 10/1977 | United Kingdom . |

OTHER PUBLICATIONS

Machine Design vol. 52, No. 10, May 8, 1980 pp. 24 to 26, Cleveland, Ohio, U.S., C. E. Wise, "Plastic Engine is Off and Running".

Primary Examiner—Robert S. Ward
Attorney, Agent, or Firm—Leydig, Voit & Mayer

[57] ABSTRACT

A piston ring formed from a plastics material and having a maximum pressure against the associated cylinder of between 0.10 and 1.50 MN/m$^2$ and preferably 0.50 MN/m$^2$. One possible material for such piston rings is polyetheretherketone. The benefits obtained are greater conformability which leads to a reduction in the number of piston rings which need be used for a particular piston. This in turn reduces friction so increasing the performance of the associated engine. Acceptable wear rates and ability to withstand operating temperatures have been found in these piston rings.

15 Claims, 14 Drawing Figures

NON-METALLIC PISTON RINGS WITH CONTROLLED EXPANSION PRESSURE

BACKGROUND TO THE INVENTION

1. Field of the Invention

The invention relates to piston rings for internal combustion engines of all kinds, and for pumps or compressors and in particular to piston rings which can be used as compression rings or as oil control rings or as both compression and oil control rings simultaneously. The invention also includes within its scope internal combustion engines containing such piston rings and methods of making such piston rings.

2. Review of the Prior Art

BRIEF DESCRIPTION OF DRAWINGS SHOWING PRIOR ART

The following is a more detailed description of three embodiments of known piston ring arrangements, by way of example, reference being made to the accompanying drawings in which:

FIG. 1 is a vertical cross-section through a part of a piston for a petrol engine having three piston rings, FIG. 2 is a similar view to FIG. 1 but through a piston of a diesel engine having three piston rings, and FIG. 3 is a similar view to FIG. 2 but showing a piston of a diesel engine having four piston rings.

DESCRIPTION OF THE PRIOR ART

Referring first to FIG. 1, the petrol engine piston 10 is formed with three annular piston ring grooves 11, 12, 13 containing corresponding piston rings 14, 15, 16. All the piston rings are made of a metalliferous material such as cast iron or steel.

The uppermost piston ring 14, that is the piston ring closest to the crown 17 of the piston, is a compression ring of rectangular cross-section. This compression ring 14 is of such an initial diameter that when the piston is inserted into a corresponding cylinder or liner (not shown) the ring presses outwardly against the cylinder or liner to seal the compression ring against the corresponding cylinder or liner to prevent the high pressure gas from the combustion chamber leaking down the sides of the piston (so-called "blow-by").

The middle ring 15 is also a compression ring and is trapezoidal in cross-section with a lower projecting edge 18 for providing a second gas seal against the associated cylinder or liner.

The lowermost piston ring 16 is an oil control ring which is formed by two flat annular rails 19, 20 which are urged outwardly against the associated cylinder or liner and which are separated by a spring expander 21. The purpose of the oil control ring is to control the supply of lubricant to the compression rings by rejecting oil downwardly, leaving only a thin film on the cylinder wall.

Referring next to FIG. 2, the diesel engine piston 30 is provided with three piston ring grooves 31, 32, 33 containing respective piston rings 34, 35, 36. All the piston rings are made of a metalliferous material such as steel or cast iron.

As with the FIG. 1 embodiment, the two upper rings 34, 35 are compression rings; the uppermost being of generally trapezoidal shape but having a curved surface 37 for contacting the associated cylinder liner. The lowermost ring 36 is an oil control ring formed as an annular member having two circumferential projecting edges 38, 39 formed by cutting away the metal of the rings. A plurality of angularly spaced radially extending holes or slots 40 are provided in this ring to allow oil to drain away into the interior of the associated groove, from which it may be removed by holes or slots (not shown) leading into the interior of the piston.

An expander 41 is provided for urging the oil control ring 36 outwardly against the associated cylinder or liner.

Referring finally to FIG. 3, the second diesel engine piston 50 has four piston ring grooves 51, 52, 53 and 54 containing respective rings 55, 56, 57 and 58. Once again, all the rings are made from a metalliferous material such as cast iron or steel.

In this case, three compression rings 55, 56 and 57 are provided. The uppermost ring is of similar construction to the uppermost ring 34 in the piston of FIG. 2 while the two intermediate rings 56, 57 are each substantially the same as the intermediate ring 15 in the piston of FIG. 1.

The lower ring 58 is an oil control ring substantially the same as the oil control ring 36 of the piston of FIG. 2.

It will, of course, be appreciated that in all the arrangements described above with reference to FIGS. 1, 2 and 3, the compression rings need not have the exact configuration shown above; they may have various combinations of non-rectangular cross-section and rubbing face profile.

APPLICANTS COMMENTS ON THE PRIOR ART

It will be seen that in all these previously proposed pistons, two or more compression rings are required. This is because cylinders or liners of internal combustion engines, due to their thermal and mechanical loading, are out of round in operation and so, in practice, it is difficult to achieve true conformability between the compression rings and the associated cylinder or liner. It is possible to increase the conformability of a compression ring by making it of a metalliferous material which allows greater variations in the shape of the ring. The metalliferous materials which allow such increased conformability, however, suffer from the disadvantage that they tend to allow particles to become embedded in them and such particles increase wear on the associated cylinder or liner. Conformability can also be increased by increasing the outwardly directed pressure between the piston ring and the associated cylinder or liner. Due, however, to the high Youngs modulus of metalliferous materials such as steel and cast iron and the inherent resistance to bending in the shape of a piston ring, the forces must be high to improve conformability, for example the outwardly directed pressure may be 2 $MN/m^2$ or above. This tends to increase the frictional forces between the piston ring and the associated cylinder.

In petrol engines, two compression rings are generally sufficient (see FIG. 1) to give the required degree of gas sealing with acceptable rates of wear. This is also true in some diesel engines (see FIG. 2). However, in those diesel engines where the combustion chamber pressures are particularly high (for example, where there is turbo-charging), three compression rings may be necessary, as shown in FIG. 3.

The purpose of the oil control ring is to meter a lubricant supply to the compression rings. It must therefore reject oil downwards leaving only a thin oil film on the cylinder. To achieve this film (probably less than 10 micrometers thick), an oil control ring should conform to the cylinder bore and dispose of rejected oil. In addition, to ensure thin films, favourable hydrodynamic action between the oil ring and the cylinder should be discouraged. This is normally achieved by using small areas of contact between the oil control rings and the cylinder and consequently high contact pressures. Some hydrodynamic action is, however, necessary with metallic rings, to reduce the severity of the ring/cylinder contact and so give a low enough wear rate for adequate service life.

It will be appreciated that the forces between the piston ring and the associated cylinder or liner are enhanced by the gas pressure at the back of the ring in the groove pushing the ring against the cylinder. This gas pressure may provide a peak pressure to assist sealing in the range 7 MN/m² to 20 MN/m²; in addition to the pressures of 0.10 MN/m² and above generated mechanically.

It can be established that if the friction between the rings and the cylinder or liner can be reduced, the fuel required for a given output of an engine can be reduced by between 2 and 3%, which is in addition to any fuel saving, for example, a further 2 or 3%, that can be reduced by reducing the contact region of the piston with the cylinder as disclosed in co-pending British Patent Application No. 82.22924.

SUMMARY OF THE INVENTION

According to a first aspect of the invention, there is provided a piston ring for an internal combustion engine, which piston ring is made from a conformable non-metallic material, the piston ring having an expansion pressure against an associated cylinder or liner of between 0.10 and 1.50 MN/m².

According to a second aspect of the invention, there is provided an internal combustion engine including at least one cylinder or liner containing a piston which is for reciprocation therein and which has at least one piston ring groove carrying a piston ring according to the first aspect of the invention and having an expansion pressure against the associated cylinder or liner of between 0.10 and 1.50 MN/m².

According to a third aspect of the invention, there is provided a method of manufacture of a piston ring according to the first aspect of the invention and comprising forming the piston ring from tough crystalline thermoplastic material by a plastics forming process.

BRIEF DESCRIPTION OF DRAWINGS OF PREFERRED EMBODIMENTS OF THE INVENTION

The following is a more detailed description of some embodiments of the invention, by way of example, reference being made to the accompanying drawings, in which:

FIG. 4 is a vertical cross-section through a part of a piston showing a first form of piston ring acting both as an oil control ring and a compression ring, FIG. 5 is a similar view to FIG. 4 but showing a second form of piston ring acting solely as an oil control ring, FIGS. 6A and 6B show alternative sections suitable for the piston rings of FIG. 4 or FIG. 5, FIGS. 7A and 7B are cross-sections of a modified form of the piston ring of FIG. 4, FIG. 8 is a vertical cross-section of part of a piston for a petrol engine incorporating the piston ring of FIG. 4, FIG. 9 is a similar view to FIG. 8 but showing a piston for a diesel engine incorporating the piston ring of either FIG. 4 or FIGS. 7A and 7B, and FIG. 10 is a similar view to FIG. 9 showing part of a diesel piston but including an additional compression ring, FIG. 11 is a graph of engine speed in revolutions per minute (r.p.m) against blow-by in liters per minute (l/min) in a 2.0 liter petrol engine using both conventional piston rings (broken line) and piston rings of the kind shown in FIG. 8 (continuous line), and FIG. 12 is a graph of engine speed in revolutions per minute (r.p.m) against engine power in kilowatts in a 2.0 liter petrol engine using both conventional piston rings and piston rings of the kind shown in FIG. 8.

DESCRIPTION OF THE PREFERRED EMBODIMENTS

Figure 4:
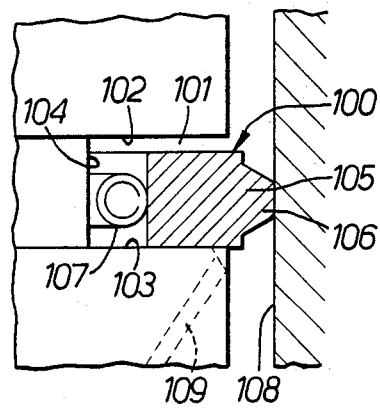

Referring first to FIG. 4, the piston 100 is formed with a piston ring groove 101 having upper and lower radially extending surfaces 102, 103 connected by an axially and circumferentially extending base 104. The piston 100 is reciprocable within a cylinder or cylinder liner 104 of an internal combustion engine.

The piston ring groove 101 contains a piston ring 105 formed of a conformable non-metallic material such as a tough crystalline thermoplastic material or an alloy thereof. An example of such a tough crystalline thermoplastic material is polyetheretherketone. This is a tough crystalline thermoplastic aromatic polyetherketone containing the repeating unit:

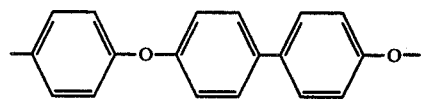

and having an inherent viscosity of at least 0.7. The polyetheretherketone may be made by the polycondensation of hydroquinone and a 4-4'-dihalobenzophenone (a proportion of which is 4-4'-difluriobenzophenone) and an alkaline metal carbonate or bicarbonate, as described in European Patent Publication No. 0001879. The polyetheretherketone may be unreinforced or may be reinforced with carbon fibres which may be randomly arranged or may be orientated to extend, for example, around the piston ring. In addition, bronze, graphite or polytetrafluoroethylene may be added to the polyetheretherketone either together or separately. For example, an alloy of the kind disclosed in British Patent Application No. 84.06547 may be used.

The piston ring is produced by forming the polyetheretherketone or polyetheretherketone alloy, into a helical coil. This is preferably done by extrusion although it may be done by casting. The cross-section of the coil is the required cross-section of the finished piston ring. The coil is then slit along one side in a plane including its longitudinal axis to form a number of rings with a gap in them.

Alternatively, the piston rings may be produced separately by an injection moulding process.

It may be desirable to arrange for the ends of the piston ring to be separated by a small gap (generally less than 0.3 mm) to accommodate thermal expansion of the ring when hot. Alternatively, the ring ends may be allowed to butt together when hot, so improving gas sealing.

As shown in FIG. 4, the cross-sectional shape of the piston ring may be generally rectangular but with a trapezoidal projection 106 on the radially outer surface of the ring for co-operation with the associated cylinder or liner 108. The piston ring 105 is received in the piston ring groove 101 and is urged outwardly by a metallic expander element 107 arranged between the radially inner ends of the piston ring and the piston ring groove. It will be appreciated that, where the piston ring 105 is produced by injection moulding, the metallic expander element 107 may be located within the piston ring 105 by moulding the piston ring around the metallic expander element 107.

It is possible, however, that the piston ring 105 may be urged outwardly against the corresponding cylinder or liner 108 by its own natural resilience. In either event, the outward force is such that the pressure between the piston ring 105 and the cylinder or liner 108 is between 0.10 and 1.50 MN/m² and is preferably of the order of 0.50 MN/m².

The piston ring groove 101 is provided with a lubricant drainage hole 109 which leads from beneath the piston ring 105 to the interior of the piston 100. This allows the piston ring 105 to act as both an oil control ring and a compression ring.

Figure 5:
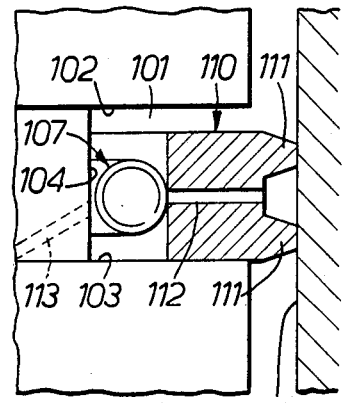

As shown in FIG. 5, however, it is possible to form the piston ring as an oil control ring only. In the following description of the FIG. 5 embodiment, parts common to FIGS. 4 and 5 are given the same reference numerals and will not be described in detail.

The oil control ring 110 is of generally rectangular cross-section and is provided with upper and lower trapezoidal cross-section projections 111 whose narrower ends bear against the associated cylinder 108. In the channel between the two projections are a number of angularly spaced radially extending holes 112 which lead to the space between the radially inner ends of the piston ring and the piston ring groove. Further holes 113 lead from the radially inner end of the piston ring groove to the interior of the piston 100 and thence to the engine sump (not shown). Accordingly, oil scraped off the cylinder by the oil control ring 110 is passed through the holes to the sump.

The oil control ring 110 is urged outwardly by an expander 107 to achieve the same ring/cylinder pressures as the arrangement of FIG. 4; that is to say a pressure of between 0.10 and 1.50 MN/m² and preferably 0.50 MN/m².

Figure 6A:
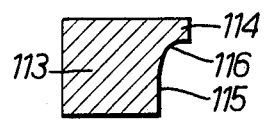
Figure 6B:
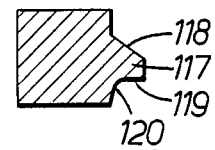

FIGS. 6A and 6B show alternative cross-sectional shapes of the piston ring of either FIG. 4 or FIG. 5 to promote downward oil scraping action. In the embodiment of FIG. 6A, the piston ring 113 is provided with an outward projection 114 at the upper edge thereof which is connected to the radially outer surface 115 of the piston ring by a curved portion 116. In FIG. 6B, the projection 117 is formed by a upper downwardly and outwardly extending surface 118 and by a lower generally radially extending surface 119 connected to the remainder of the piston ring at its inner end by a curved portion 120.

It will be appreciated that the arrangements of FIGS. 6A and 6B may be combined to produce a design having two projections.

Figure 7A:
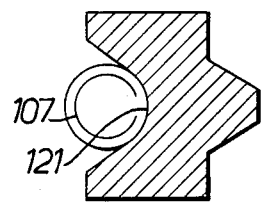
Figure 7B:
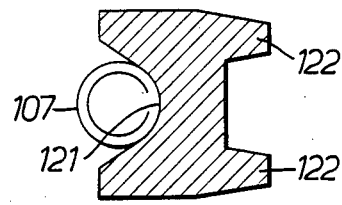

Referring next to FIGS. 7A and 7B, it will be appreciated that the radially inner end of any of the piston rings described above with reference to FIGS. 4, 5, 6A and 6B of the drawings may be modified to include a circumferentially extending groove 121 for accommodating partly the expander 107, thus locating the expander and easing assembly. In addition, as shown in FIG. 7B, the piston ring may include upper and lower projections 122, each projection 122 being of trapezoidal cross-section narrowing as it extends away from the body of the piston ring.

Figure 1:
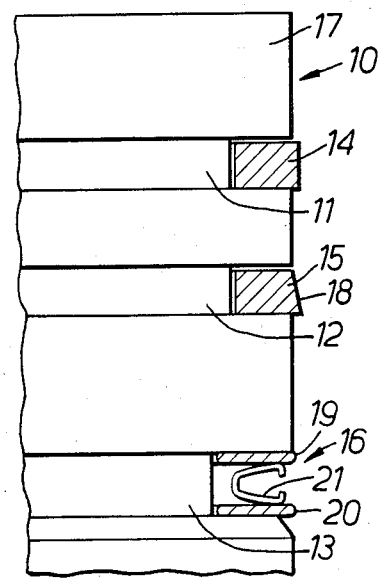
Figure 8:
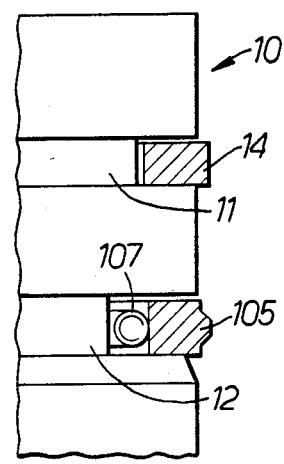
Figure 9:
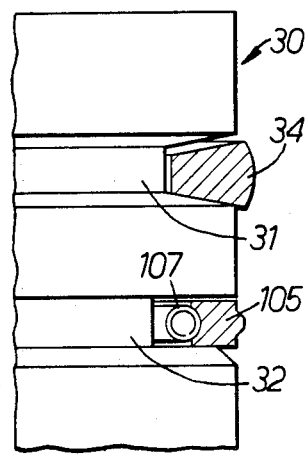
Figure 10:
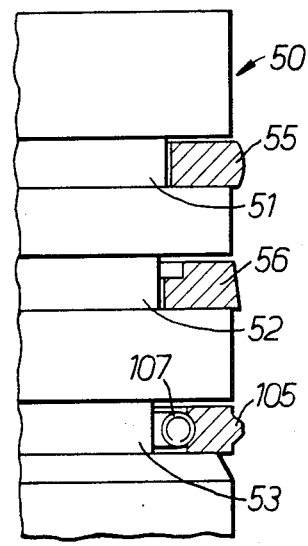

Referring next to FIGS. 8, 9 and 10, these show how the piston rings described above with reference to FIGS. 4 to 7 of the drawings can be incorporated in petrol and diesel engines. Parts common to these Figures and to FIGS. 4 to 7 will not be described in detail but will be given the same reference numerals. The FIG. 8 embodiment shows an arrangement which can be substituted for the conventional arrangement of FIG. 1. Referring both to FIG. 8 and FIG. 1, it will be seen that, in FIG. 8, the intermediate compression ring 18 is omitted and that the arrangement of FIG. 7A is substituted in its place, with the lower piston ring 105 acting as both a compression ring and an oil control ring.

Figure 2:
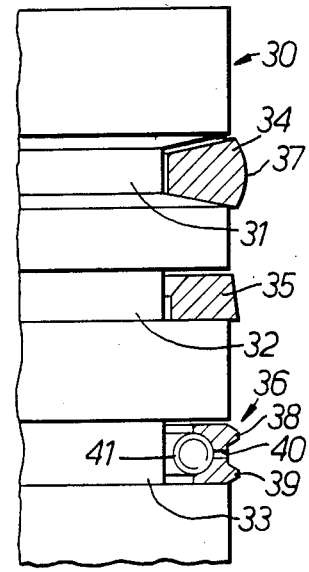

The FIG. 9 arrangement is an alternative to the conventional arrangement shown in FIG. 2 and, referring to both these Figures, it will be seen, once again, that the intermediate ring 35 is omitted and the arrangement of FIGS. 4 and 7A substituted with the piston ring 105 acting as both a compression ring and an oil control ring.

Figure 3:
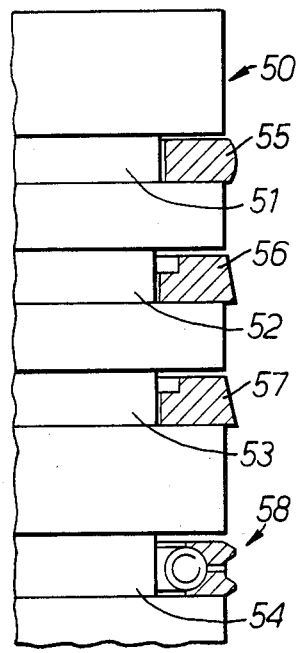

Referring next to FIG. 10, this shows an arrangement which can be substituted for the conventional arrangement shown in FIG. 3. In the FIG. 7 arrangement, one of the compression rings 57 is omitted and the arrangement of FIGS. 4 and 7A substituted. The piston ring 105 again acts as both a compression ring and an oil ring.

The use of the rings described above with reference to FIGS. 4 to 7 allows a compression ring to be dispensed with because of the improved sealing and wearing properties of these rings as compared with piston rings of the type described above with reference to FIGS. 1 to 3. The piston rings of FIGS. 4 to 7 have high conformability at low radial forces and this allows the piston rings to form an excellent seal with the associated cylinder without inducing high frictional forces between the rings and the cylinder. A simple analysis shows that conformability increases with the value of the piston ring parameter (K) where:

$$K = \frac{P_o b R^3}{EI} = \frac{12 P_o R^3}{E R_f^3}$$

and $P_o$ = nominal wall pressure of ring,
b = ring axial width,
R = closed mean ring radius,
E = Youngs modulus for ring material,
I = second moment of area of ring cross-section,
$R_f$ = radial width of ring cross-section.

Thus, good conformability may be achieved by high wall pressures and/or by low Youngs modulus of ring material and/or by high axial width or low radial width. It will be appreciated, however, that the last two factors, high axial width and low radial width, are limited by considerations of strength, function and assembly and in practice, large variations in these are impossible. In metalliferous materials, a low modulus is not possible and so the value of K can only be increased by increasing the nominal wall pressure of the ring which may exceed 2 MN/m², as discussed above with reference to FIGS. 1 to 3. As also discussed, this increases the friction between the piston ring and the associated cylinder as well as increasing the wear and may necessitate special treatment of the rings and cylinders such as chromium plating or nitro-carburising.

However, the materials described above with reference to FIGS. 4 to 7 have a Youngs modulus which is a tenth or less that of metalliferous materials. Accordingly, they can achieve the same conformability or K value with one tenth or less of the wall pressure.

The use of polyetheretherketone or polyetheretherketone alloys and other thermoplastic materials has another important benefit. This is that the flexural modulus of these materials reduces as temperatures rise. It has been found that the Youngs modulus may reduce by 50% between 150° C. and 200° C. Thus, K will increase and the conformability of the piston ring will also increase. Although such a reduction in Youngs modulus will reduce the inherent outward pressure exerted by the piston ring, this will not be a problem where the outward pressure is provided by an expander element.

Thus piston rings of the kind described above with reference to FIGS. 4 to 10 have the advantage that they increase their conformability at a time when the distortion of the cylinder is at a maximum, i.e. when increased conformability is most required.

The following are two Examples of tests performed using piston rings of the kind described above with reference to FIGS. 4 to 10 of the accompanying drawings.

EXAMPLE 1

A comparative test was performed using a single cylinder Petters AVB.D.I. diesel engine in which the piston initially had a piston ring arrangement of the kind shown in FIG. 3 of the accompanying drawings and then had a piston ring arrangement of the kind shown in FIG. 10. Two tests were performed, an initial proving test of 5 hours and a second test of 42 hours.

In the initial proving test, the FIG. 10 arrangement showed an observable decrease in fuel consumption and a slight decrease in oil consumption in comparison with the FIG. 3 arrangement. In the second test, the FIG. 10 arrangement showed a reduction in ring radial width from 4 mm to 3 mm, radial ring wear of 20 micrometers (48 micrometers per 100 hours) and axial ring wear of 36 micrometers (85 micrometers per 100 hours). The engine was run at a relatively high rating for the final 20 hours of the test (at a 150 psi/10.3 bar bmep).

EXAMPLE 2

Figure 11:
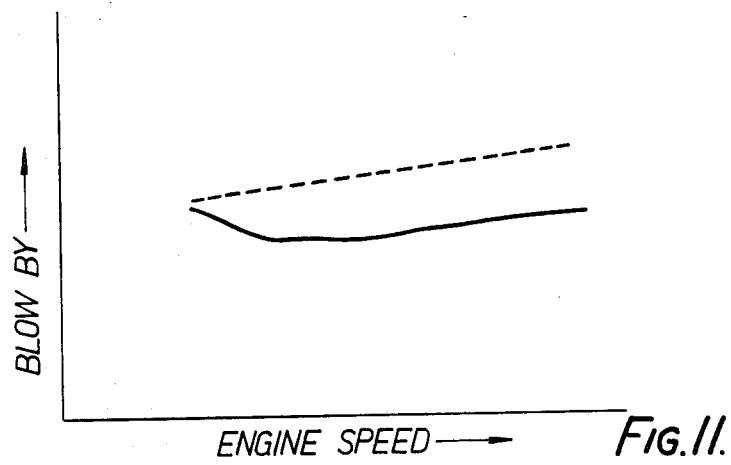

A 4-cylinder 2.0 liter petrol engine was fitted first with a piston ring arrangement of the kind shown in FIG. 1 and, second, with a piston ring arrangement of the kind shown in FIG. 8. In both cases measurements were made of the blow-by and the engine power at various engine speeds, after an initial 10 hours of running to "break in" the engine and so obtain steady running. The results of these tests are shown in FIG. 11 (blow-by) and FIG. 12 (power) the conventional piston rings given the broken line and the FIG. 8 rings the continuous line.

Figure 12:
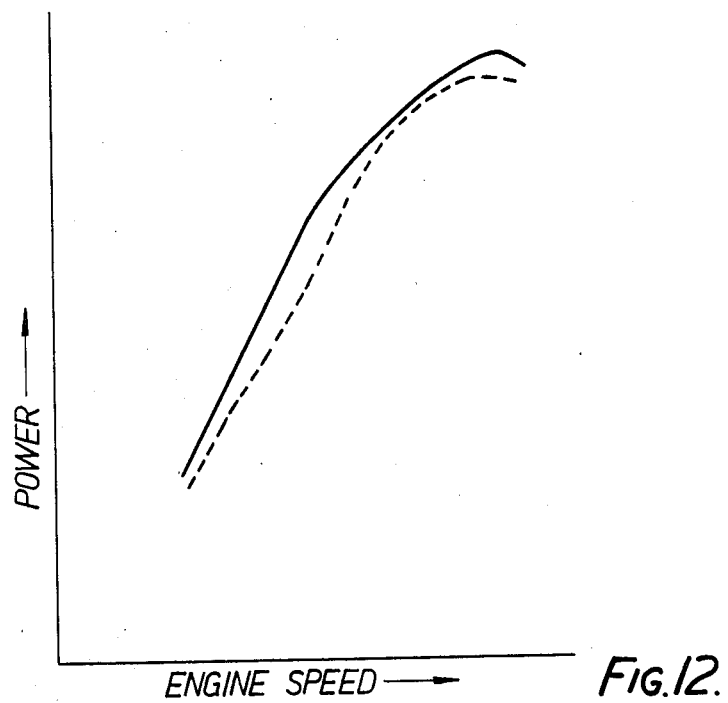

It will be seen that the piston ring arrangement of FIG. 8 provides a significant decrease in blow-by in comparison with a conventional piston ring arrangement. The improvement is particularly marked in the mid-range of engine speeds, which is the speed most common in engine operation in a vehicle. As a consequence of this decrease in blow-by, the engine power is correspondingly increased, as shown in FIG. 12. Once again the greatest improvement is in the commonly used mid-range of engine speeds. It is believed that the oil consumption of the engine including the piston ring arrangement of FIG. 8 can be controlled to be not substantially different from the oil consumption of the engine using the conventional piston ring arrangement of FIG. 1.

The above test Examples show the ability of piston rings of the kind described above with reference to FIGS. 4 to 10 to provide improved performance with acceptable wear.

I claim:

1. An internal combustion engine including:
   a sump;
   at least one cylinder or liner,
   a piston arranged within said cylinder or liner for reciprocation therein,
   at least one piston ring groove provided on said piston,
   a combined compression and oil control piston ring received within said at least one piston ring groove and made from a conformable non-metallic material,
   said piston ring having an expansion pressure against the associated cylinder or liner of between 0.10 and 1.50 MN/m²,
   said at least one piston ring groove being provided with a plurality of apertures to drain into said sump oil scraped from said cylinder or liner by said piston ring.

2. A piston ring according to claim 1, wherein the material is such that the expansion pressure is of the order of 0.50 MN/m².

3. A piston ring according to claim 1, wherein the expansion pressure is provided by the natural springiness of the material.

4. A piston according to claim 1, wherein the expansion pressure is at least partially provided by spring means.

5. A piston according to claim 4, wherein said spring means are for arrangement between a radially inner end of the piston ring and an associated piston ring groove.

6. A piston according to claim 4, wherein said spring means is incorporated in, and surrounded by, said conformable non-metallic material.

7. An engine according to claim 1, wherein the conformable non-metallic material is polyetheretherketone.

8. An engine according to claim 7, wherein the polyetheretherketone is reinforced with fibres.

9. An engine according to claim 7, wherein the polyetheretherketone includes one or more additives from the group bronze, graphite, polytetrafluoroethylene.

10. An engine according to claim 1, wherein the piston ring has a generally U-shaped cross-section with the upper and lower limbs of the U providing upper and lower circumferential sealing lands.

11. An engine according to claim 1, and having a generally rectangular cross-section with a single projection, on an outer surface thereof, for sliding engagement with the associated cylinder or liner.

12. An engine according to claim 1, wherein the or each said piston ring groove is provided with a plurality of apertures to drain away oil into the interior of the piston and thence into a sump of the engine.

13. An engine according to claim 1, wherein said apertures lead from a lower radially extending surface of the piston ring groove.

14. An engine according to claim 1, wherein said apertures lead from an axially extending surface of the associated piston ring.

15. An internal combustion engine comprising:
   at least one cylinder or liner,
   a piston arranged for reciprocation within said cylinder or liner,
   a crown provided on said piston,
   a number of piston ring grooves provided on said piston and receiving a corresponding number of piston rings,
   one of said number of piston ring grooves being closest to said crown,
   one of said number of piston rings being a compression ring of metalli-ferrous material received in said one of said number of piston ring grooves for resisting blow-by of said combustion products between said piston and said cylinder or liner,
   a second of said number of piston rings being
   a combined compression and oil control ring received in a second of said number of piston ring grooves,
   said combined compression and oil control ring being of a comformable non-metallic material and having an expansion pressure against the associated cylinder or liner of between 0.10 MN/m$^2$ and 1.50 MN/m$^2$, and
   the total number of rings, both compression and oil control, being at least one less than would be necessary if all the rings are metalliferrous, thereby to reduce friction.

* * * * *